(12) United States Patent
Gyoten (10) Patent No.: US 9,532,017 B2
(45) Date of Patent: Dec. 27, 2016

(54) LIGHT SENSITIVITY CONTROLLING APPARATUS AND PROJECTION-TYPE DISPLAY DEVICE EQUIPPED WITH SAME

(71) Applicant: Panasonic Corporation, Kadoma-shi, Osaka (JP)

(72) Inventor: Takaaki Gyoten, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 207 days.

(21) Appl. No.: 14/094,171

(22) Filed: Dec. 2, 2013

(65) Prior Publication Data

US 2014/0160440 A1 Jun. 12, 2014

(30) Foreign Application Priority Data

Dec. 6, 2012 (JP) ................. 2012-267113

(51) Int. Cl.
| | |
|---|---|
| G01J 1/44 | (2006.01) |
| H04N 9/31 | (2006.01) |
| G01J 1/20 | (2006.01) |
| G03B 21/20 | (2006.01) |
| G03B 33/08 | (2006.01) |
| G01J 1/42 | (2006.01) |
| G01J 3/50 | (2006.01) |

(52) U.S. Cl.
CPC .............. *H04N 9/3138* (2013.01); *G01J 1/20* (2013.01); *G01J 1/44* (2013.01); *G03B 21/204* (2013.01); *G03B 21/2013* (2013.01); *G03B 21/2053* (2013.01); *G03B 33/08* (2013.01); *H04N 9/3114* (2013.01); *H04N 9/3158* (2013.01); *H04N 9/3194* (2013.01); *G01J 3/505* (2013.01); *G01J 2001/4247* (2013.01)

(58) Field of Classification Search
CPC ......................................................... G01J 1/44
USPC ......................................................... 356/226
See application file for complete search history.

(56) References Cited

U.S. PATENT DOCUMENTS 4,673,807 A * 6/1987 Kobayashi ......... G01N 21/5907
250/214 AG
4,739,459 A * 4/1988 Kobayashi ......... G01N 21/5907
362/307

(Continued)

FOREIGN PATENT DOCUMENTS

JP 2012-053279 3/2012

*Primary Examiner* — Roy M Punnoose
(74) *Attorney, Agent, or Firm* — Hamre, Schumann, Mueller & Larson, P.C.

(57) ABSTRACT

The light sensitivity controlling apparatus comprises an optical semiconductor, an amplifier element, a resistor unit, an A/D converter, and a controller. The optical semiconductor receives a plurality of colors of light emitted from a light source in a time division. The amplifier element converts optical current flowing to the optical semiconductor into voltage by receiving the plurality of colors of light. The resistor unit switches the gain for converting the optical current inputted to the amplifier element into voltage, for each of the plurality of colors of light. The A/D converter converts the voltage outputted by the amplifier element from an analog signal into a digital signal. The sensitivity controlling apparatus controls the resistor unit so that the output level corresponding to the various colors of light outputted from the A/D converter will remain substantially same level.

5 Claims, 8 Drawing Sheets

(56) References Cited

U.S. PATENT DOCUMENTS

| | | | | |
|---|---|---|---|---|
| 4,789,777 | A * | 12/1988 | Takami | H01L 31/02019 250/214 A |
| 5,138,149 | A * | 8/1992 | Cadet | G01N 21/27 250/214 AG |
| 5,678,132 | A * | 10/1997 | Shiba | G03G 15/5058 399/59 |
| 6,222,176 | B1 * | 4/2001 | Rushing | G01N 21/27 250/214 AG |
| 6,225,618 | B1 * | 5/2001 | Rushing | G01N 21/5907 250/214 AG |
| 6,331,832 | B1 * | 12/2001 | Rushing | H03M 1/1235 250/214 AG |
| 6,757,084 | B2 * | 6/2004 | Kurita | H04N 1/484 358/504 |
| 7,022,967 | B2 * | 4/2006 | Horiguchi | G01J 1/44 250/214 A |
| 7,110,498 | B2 * | 9/2006 | Yamada | G01T 1/2928 250/208.1 |
| 7,518,094 | B2 * | 4/2009 | Margulis | G01J 1/44 250/214 A |
| 7,554,072 | B2 * | 6/2009 | Schmidt | H03F 3/08 250/214 A |
| 2003/0197904 | A1 * | 10/2003 | Kurita | H04N 1/484 358/509 |
| 2004/0165025 | A1 * | 8/2004 | Ishibashi | H04N 1/00002 347/19 |

\* cited by examiner

FIG. 1

FIG. 2A  (a) With no gain switching

FIG. 2B  (b) Timing of gain switching

FIG. 2C  (c) With gain switching

LIGHT SENSITIVITY CONTROLLING APPARATUS AND PROJECTION-TYPE DISPLAY DEVICE EQUIPPED WITH SAME

CROSS-REFERENCE TO RELATED APPLICATIONS

This application claims priority to Japanese Patent Application No. 2012-267113 filed on Dec. 6, 2012. The entire disclosure of Japanese Patent Application No. 2012-267113 is hereby incorporated herein by reference.

BACKGROUND

The present disclosure relates to a light quantity measurement apparatus that measures the quantity of light of various colors in a time-division color display projector light source, and to a projection-type display device equipped with this apparatus.

Patent Literature 1 (Japanese Laid-Open Patent Application 2012-53279) discloses a color image formation device that allows good gradation expression corresponding to changes in the light quantity of a light source.

This color image formation device comprises an image input terminal to which an image signal is inputted, an image data converter for producing an image signal that is converted on the basis of a gradation conversion table, with respect to an image signal inputted from the image input terminal, a sensor for measuring the light quantity of various light source devices, and a gradation conversion table update section for measuring the light quantity with the sensor both just after the light source devices are turned on and just before they are turned off by an emission controller, and updating the gradation conversion table.

Thus, with the light source device disclosed in the above-mentioned publication, a sensor that measures the light quantity of various light source devices is used to measure the light quantity immediately after the light is turned on and immediately before it is turned off, and a digital signal that has undergone A/D conversion is corrected by using gain.

Consequently, good gradation expression can be obtained even if there are individual differences between devices, changes in the environment, changes over time, etc.

However, with the light quantity measurement apparatus disclosed in the above-mentioned publication, the light quantity of a plurality of colors of light emitted from the light source of a time-division color display projector is measured using a single photosensor. When a single photosensor is thus used to measure the light quantity of a plurality of colors of light, there is a large difference in the measurement sensitivity for red, green, and blue, so measurement accuracy ends up decreasing.

Furthermore, there is generally a difference in the projection energy of a plurality of colors of light because the colors are balanced so that the desired white will be achieved with three colors, such as red, green, and blue.

This disclosure provides a light quantity measurement apparatus with which measurement accuracy can be improved by controlling the measurement sensitivity for red, green, and blue, even when the light quantity of a plurality of colors of light (that are emitted from a light source and have different energies) are measured with a single photosensor, as well as a projection-type display device equipped with this apparatus.

SUMMARY

The light quantity measurement apparatus disclosed herein comprises an optical semiconductor, an amplifier element, a resistor unit, an A/D converter, and a controller. The optical semiconductor receives a plurality of colors of light emitted from a light source in a time division. The amplifier element converts optical current flowing to the optical semiconductor into voltage by receiving the plurality of colors of light. The resistor unit switches the gain for converting the optical current inputted to the amplifier element into voltage, for each of the plurality of colors of light. The A/D converter converts the voltage outputted by the amplifier element from an analog signal into a digital signal. The controller controls the resistor unit so that the output level corresponding to the various colors of light outputted from the A/D converter will remain substantially same level.

With the disclosure disclosed herein, a light quantity measurement apparatus with which the light quantity of various colors can be measured more accurately can be provided by optimally switching the sensitivity of an optical semiconductor to match a plurality of colors of light emitted from a light source.

BRIEF DESCRIPTION OF DRAWINGS

FIG. 7 is a configuration diagram of the projection-type display device pertaining to Embodiment 6; and.

DETAILED DESCRIPTION

Embodiments will now be described through reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The inventor has provided the appended drawings and the following description so that a person skilled in the art may fully understand this disclosure, but does not intend for these to limit what is discussed in the patent claims.

(Embodiment 1)

A light quantity measurement apparatus 10 pertaining to Embodiment 1 of this disclosure will now be described through reference to FIGS. 1 to 2C.

1-1. Configuration and Operation

Figure 1:
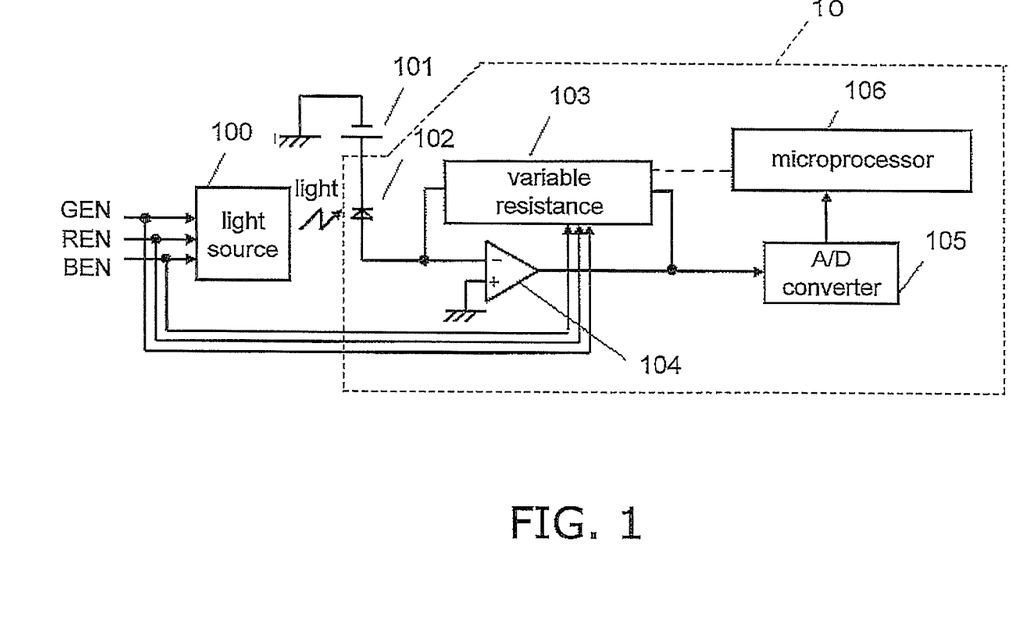
FIG. 1 is a configuration diagram of the light quantity measurement apparatus pertaining to Embodiment 1.

FIG. 1 is a configuration diagram of the light quantity measurement apparatus 10 pertaining to Embodiment 1.

The light quantity measurement apparatus 10 pertaining to this embodiment is an apparatus for measuring the light quantity emitted from a light source 100 when voltage is applied from a power supply 101, and comprises a photodiode (optical semiconductor) 102, a variable resistance 103, an op-amp 104, an A/D (Analog/Digital) converter 105, and a microprocessor 106.

First, the light source 100 that shines light on the light quantity measurement apparatus 10, and the power supply 101 that applies voltage to the light quantity measurement apparatus will be described.

The light source 100 is constituted so as to include a plurality of light sources, such as red (R), green (G), and blue (B) LEDs. The light source 100 emits red, green, and blue light according to lighting control signals REN, GEN, and BEN received from the outside.

The lighting control signals REN, GEN, and BEN are outputted by a formatter (not shown).

The formatter outputs a control signal to the light source 100, the variable resistance 103, and a DMD 810 (discussed below) when an image signal is inputted from the outside. For example, when the light source 100 has received a red lighting control signal REN from the outside, the formatter indicates that the light source 100 is being controlled so that only red light is emitted, out of the plurality of light sources (such as red, green, and blue LEDs) included in the light source 100.

The power supply 101 applies bias voltage to the photodiode 102. The photodiode 102 receives light emitted from the light source 100. The op-amp 104 converts optical current flowing to the photodiode 102 into voltage. The variable resistance 103 switches the gain according to the lighting control signals REN, GEN, and BEN. The gain is used in converting the optical current inputted to the op-amp 104 into voltage.

Next, the specific configuration of the light quantity measurement apparatus 10 in this embodiment will now be described.

The A/D converter 105 converts the analog output signal from the op-amp 104 into a digital signal. The microprocessor 106 stores output data from the A/D converter 105 for a plurality of colors of light (red, blue, and green), and controls the variable resistance 103 so that the output level of the op-amp 104 (discussed below) will remain substantially same level.

Figures 2A, 2B:
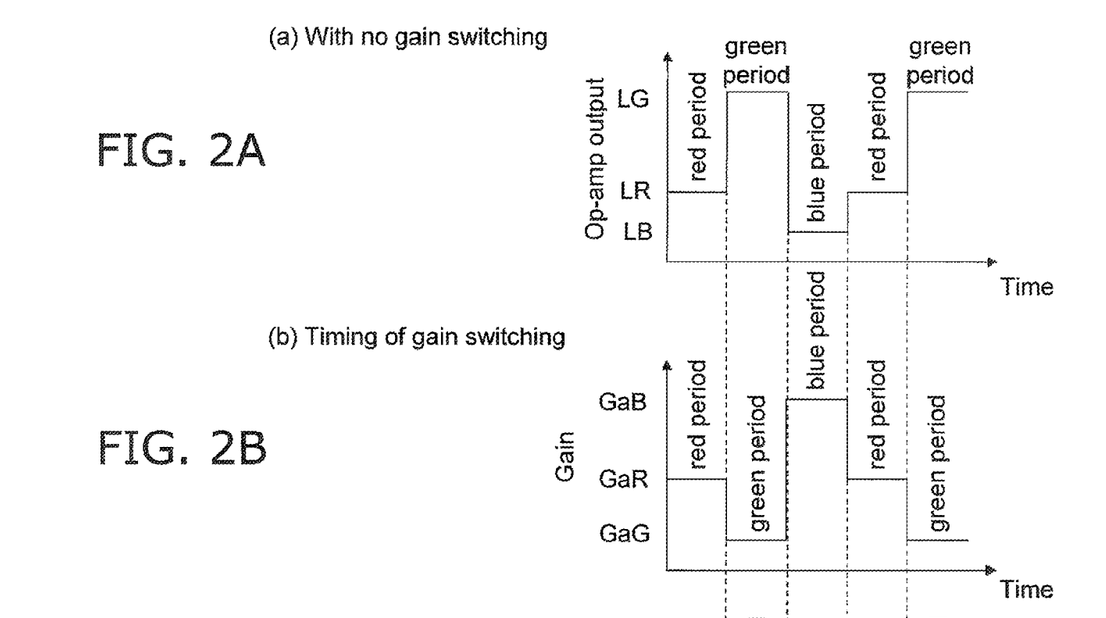
FIGS. 2A to 2C are graphs of the effect of the light quantity measurement apparatus in FIG. 1.
Figure 2C:
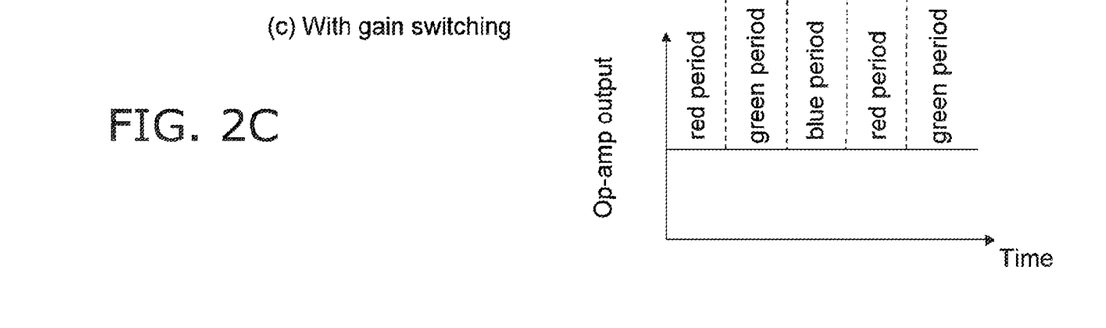

FIGS. 2A to 2C are graphs of the effect of the light quantity measurement apparatus 10 in Embodiment 1.

FIG. 2A shows the output of the op-amp 104 when the gain is not switched by the variable resistance 103. In FIG. 2A, the vertical axis is the output of the op-amp 104, and the horizontal axis is time.

As discussed above, the light source 100 emits red, green, and blue light to the light quantity measurement apparatus 10.

When the emission period of the light source 100 is the red period, that is, when the light source 100 emits red light, the output of the op-amp is LR. When the emission period of the light source 100 is the green period, that is, when the light source 100 emits green light, the output of the op-amp is LG. When the emission period of the light source 100 is the blue period, that is, when the light source 100 emits blue light, the output of the op-amp is LB.

The levels of the output of the op-amp 104 in the red, green, and blue emission periods of the light source 100 are LR, LG, and LB, which are mutually different. This is attributable to the fact that the amount of input energy is different for red, green, and blue light from the light source 100, and that the sensitivity varies with the wavelength of the input light of the photodiode 102.

FIG. 2B shows the relation between the gain and the timing at which the gain is switched, when the gain is switched by the variable resistance 103. In FIG. 2B, the vertical axis is the gain, and the horizontal axis is time.

As shown in FIG. 2B, the resistance value of the variable resistance 103 is adjusted so that the gain will be lower at the point when the output of the op-amp 104 shown in FIG. 2A is high, and will be higher at the point when the output of the op-amp 104 is low, according to the lighting control signals REN, GEN, and BEN.

More specifically, when the emission period of the light source 100 shown in FIG. 2B is the red period, the gain of the variable resistance 103 is set to GaR. When the emission period of the light source 100 shown in FIG. 2B is the green period, the gain of the variable resistance 103 is set to GaG. When the emission period of the light source 100 shown in FIG. 2B is the blue period, the gain of the variable resistance 103 is set to GaB.

In this embodiment, as discussed above, the gain of the variable resistance 103 is switched in the red, green and blue emission periods of the light source 100. More specifically, the gain of the op-amp 104 that converts the output current of the photodiode 102 into voltage is optimally switched according to the plurality of colors of light emitted from the light source 100.

FIG. 2C shows the output of the op-amp 104 when the gain of the variable resistance 103 is switched. In FIG. 2C, the vertical axis is the output of the op-amp 104, and the horizontal axis is time.

When the emission period of the light source 100 is the red period, the output LR of the op-amp 104 shown in FIG. 2A is adjusted using the gain GaR of the variable resistance 103 shown in FIG. 2B.

When the emission period of the light source 100 is the green period, the output LG of the op-amp 104 shown in FIG. 2A is adjusted using the gain GaG of the variable resistance 103 shown in FIG. 2B.

When the emission period of the light source 100 is the blue period, the output LB of the op-amp 104 shown in FIG. 2A is adjusted using the gain GaB of the variable resistance 103 shown in FIG. 2B.

When the gain of the variable resistance 103 is switched, the system is controlled so that the levels of the output of the op-amp 104 in the red, green and blue emission periods of the light source 100 will remain substantially same level.

Consequently, as shown in FIG. 2C, the levels of the output of the op-amp 104 in the red, blue, and green emission periods of the light source 100 can be kept substantially same level.

1-2. Effect, Etc.

Thus, with the light quantity measurement apparatus 10 in this embodiment, the microprocessor 106 controls the value of the variable resistance 103 so that the output of the op-amp 104 will remain substantially same level in the periods when red, green and blue light is being outputted by the light source 100 in a time division.

Consequently, even if the energy amounts of the input level of the signals inputted to the A/D converter 105 vary with the color, or if the sensitivity of the photodiode 102 varies with the wavelength of light of the various colors, the output level of the op-amp 104 can be kept substantially same level.

Accordingly, since the input level of the signals inputted to the A/D converter 105 is substantially same level, the input level for each color of the signals inputted to the A/D converter 105 can be quantized to numerical values of about the same magnitude. Therefore, there will be less quantization noise with respect to the digital value after A/D conversion.

The reason behind the above effect will now be explained.

The A/D converter 105 includes a finite quantization step. The closer the input signal level of the A/D converter 105 is to the maximum convertible input signal level, the higher is the outputted digital value. On the other hand, closer the input signal level of the A/D converter 105 is to the minimum convertible input signal level, the lower is the outputted digital value.

Specifically, with the light quantity measurement apparatus 10 in this embodiment, the system is controlled so that the input level of signals inputted to the A/D converter 105 remains substantially same level by adjusting the resistance of the variable resistance 103 for each color in each period in which the light source 100 emits red, green and blue light.

Consequently, the input signal level of the A/D converter 105 can be kept substantially same level in the red, green and blue light output periods, and the input level of the A/D converter 105 can be set to a value close to the maximum value. As a result, quantization noise with respect to the digital value after A/D conversion can be reduced.

Let us now compare the situations when gain adjustment by variable resistance is not performed as in the past, and when gain adjustment is performed by the variable resistance 103 as in this embodiment.

A comparison of these two reveals that there is a difference of about 10 times in the output level from the op-amp 104, for example when a commonly used silicon photodiode is generally used as the photodiode 102. This is because the dynamic range of an A/D converter cannot be effectively utilized with some colors of light outputted from the light source 100.

In contrast, with the light quantity measurement apparatus 10 in this embodiment, as discussed above, since the gain is adjusted by the variable resistance 103, the measurement accuracy is roughly ten times higher, for example. Therefore, the dynamic range of the A/D converter 105 can be effectively utilized, and measurement results of the same high accuracy can be obtained for all colors.

1-3. Correspondence of Terminology

The light source 100 is an example of a light source that emits a plurality of colors of light. The photodiode 102 is an example of an optical semiconductor that receives a plurality of colors of light. The power supply 101 is an example of a power supply. The op-amp 104 is an example of an amplifier element. The variable resistance 103 and units 210 and 310 (discussed below) are examples of resistor units. The A/D converter 105 is an example of an A/D converter. The microprocessor 106 is an example of a controller.

(Embodiment 2)

A light quantity measurement apparatus 20 pertaining to Embodiment 2 of this disclosure will now be described through reference to FIG. 3.

2-1. Configuration

Figure 3:
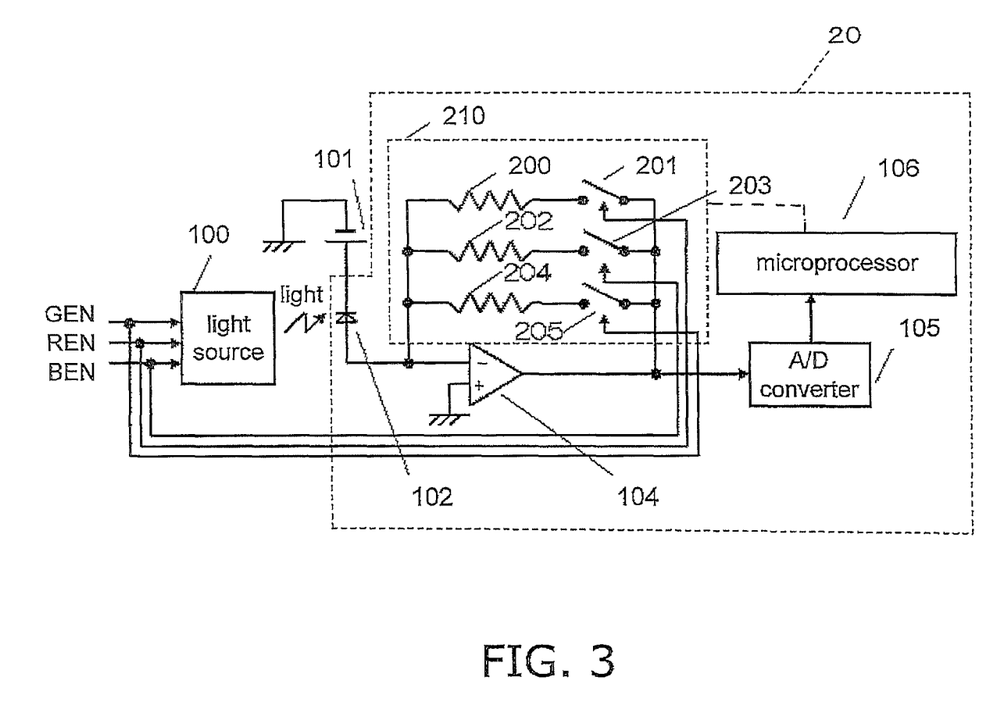
FIG. 3 is a configuration diagram of the light quantity measurement apparatus pertaining to Embodiment 2.

FIG. 3 is a configuration diagram of the light quantity measurement apparatus 20 pertaining to Embodiment 2.

Of the components described in this embodiment, those having the same function, shape, etc., as the components described in Embodiment 1 above will be numbered the same and not described again in detail.

The light quantity measurement apparatus 20 in this embodiment comprises a resistor unit 210 instead of the variable resistance 103 of the light quantity measurement apparatus 10 pertaining to Embodiment 1.

The light quantity measurement apparatus 20 pertaining to this embodiment is an apparatus for measuring the light quantity emitted from the light source 100 when voltage is applied from the power supply 101, and comprises the photodiode (optical semiconductor) 102, the resistor unit 210, the A/D converter 105, and the microprocessor 106.

The resistor unit 210 comprises three circuits connected in parallel.

More specifically, the first circuit comprises a resistor 200 and an analog switch 201 connected in series. The second circuit comprises a resistor 202 and an analog switch 203 connected in series. The third circuit comprises a resistor 204 and an analog switch 205 connected in series.

2-2. Operation

The analog switch 201 is ON (that is, allows current to flow) while the light source 100 is outputting red light, and is OFF (that is, blocks current) while light of other colors is being outputted. Thus, the gain of the op-amp 104 while the light source 100 is outputting red light is determined by the resistance of the resistor 200.

The analog switch 203 is ON (that is, allows current to flow) while the light source 100 is outputting blue light, and is OFF (that is, blocks current) while light of other colors is being outputted. Thus, the gain of the op-amp 104 while the light source 100 is outputting blue light is determined by the resistance of the resistor 202.

The analog switch 205 is ON (that is, allows current to flow) while the light source 100 is outputting green light, and is OFF (that is, blocks current) while light of other colors is being outputted. Thus, the gain of the op-amp 104 while the light source 100 is outputting green light is determined by the resistance of the resistor 204.

Specifically, with the light quantity measurement apparatus 20 in this embodiment, during the period in which red light is being outputted from the light source 100, only the analog switch 201 is ON, and the analog switches 203 and 205 are OFF. During the period in which blue light is being outputted from the light source 100, only the analog switch 203 is ON, and the analog switches 201 and 205 are OFF. During the period in which green light is being outputted from the light source 100, only the analog switch 205 is ON, and the analog switches 201 and 203 are OFF.

Consequently, a gain at which the output levels for the various colors are substantially same level can be obtained by setting the resistance values for the resistors 200, 202, and 204 according to the sensitivity of the photodiode 102 or the input levels corresponding to the various colors.

The various gain values are used in converting the optical current output of the photodiode 102 into voltage by the op-amp 104.

2-3. Effect, Etc.

With the light quantity measurement apparatus 20 in this embodiment, because of the above configuration, the microprocessor 106 controls whether the analog switches 201, 203, and 205 are ON or OFF so that the output of the op-amp 104 will remain substantially same level in the periods when red, blue, and green light is being outputted in a time division by the light source 100.

Consequently, even if the energy amounts of the input level of the signals inputted to the A/D converter 105 vary with the color of light, or if the sensitivity of the photodiode 102 varies with the wavelength of light, the output level of the op-amp 104 can be kept substantially same level.

(Embodiment 3)

A light quantity measurement apparatus 30 pertaining to Embodiment 3 of this disclosure will now be described through reference to FIG. 4.

3-1. Configuration

Figure 4:
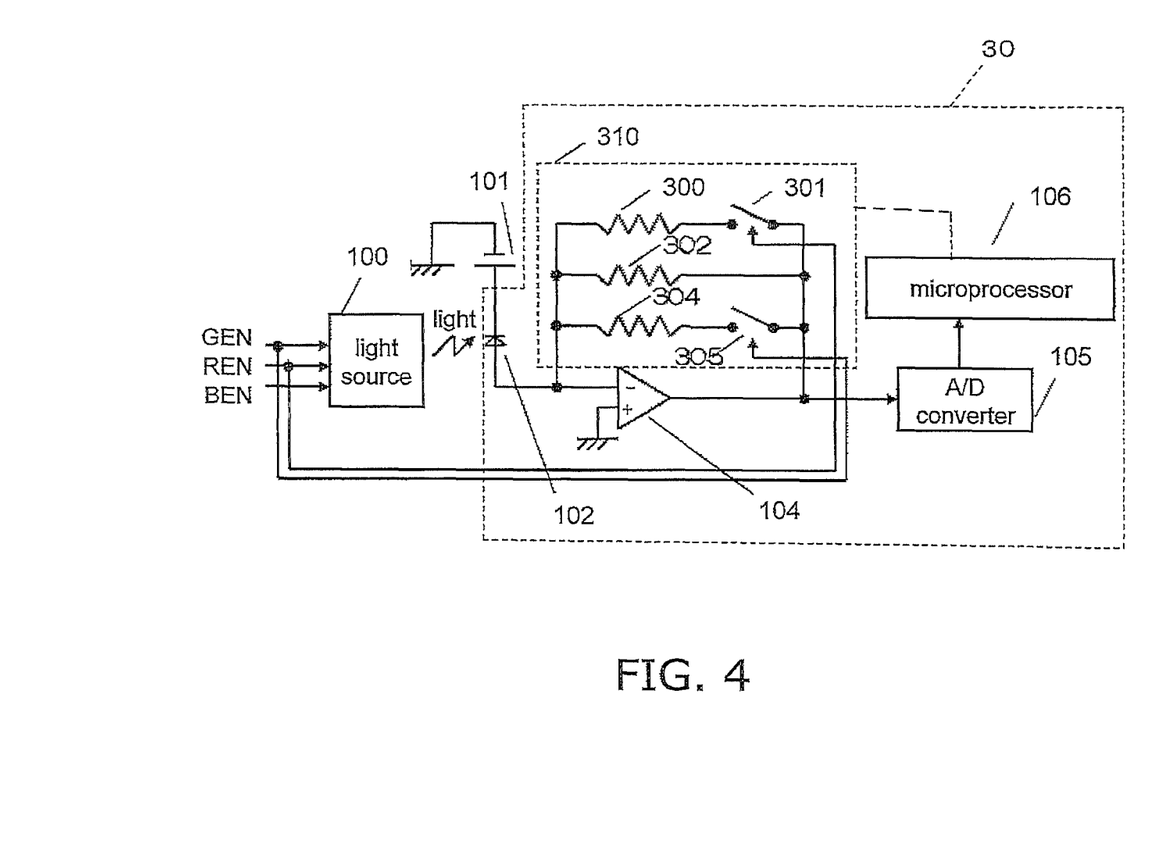
FIG. 4 is a configuration diagram of the light quantity measurement apparatus pertaining to Embodiment 3.

FIG. 4 is a configuration diagram of the light quantity measurement apparatus 30 pertaining to this embodiment.

Of the components described in this embodiment, those having the same function, shape, etc., as the components described in Embodiments 1 and 2 above will be numbered the same and not described again in detail.

The light quantity measurement apparatus 30 in this embodiment comprises a resistor unit 310 instead of the variable resistance 103 of the light quantity measurement apparatus 10 pertaining to Embodiment 1.

The light quantity measurement apparatus 30 in this embodiment comprises the light source 100, the power supply 101, the photodiode (optical semiconductor) 102, the resistor unit 310, the A/D converter 105, and the microprocessor 106.

The resistor unit 310 comprises three circuits connected in parallel.

More specifically, the first circuit comprises a resistor 300 and an analog switch 301 connected in series. The second circuit comprises a resistor 302. The third circuit comprises a resistor 304 and an analog switch 305 connected in series.

Specifically, the light quantity measurement apparatus 30 in this embodiment differs from the light quantity measurement apparatus 20 in Embodiment 2 above in that there is one fewer part (analog switch) constituting the resistor unit.
3-2. Operation The analog switch 301 is ON (that is, allows current to flow) while the light source 100 is outputting red light, and is OFF (that is, blocks current) while light of other colors is being outputted. Thus, the gain of the op-amp 104 while the light source 100 is outputting red light is determined by the serial resistance of the resistor 300 and the resistor 302.

The analog switch 305 is ON (that is, allows current to flow) while the light source 100 is outputting green light, and is OFF (that is, blocks current) while light of other colors is being outputted. Thus, the gain of the op-amp 104 while the light source 100 is outputting green light is determined by the serial resistance of the resistor 302 and the resistor 304.

While the light source 100 is outputting blue light, the analog switches 301 and 305 are both OFF, and block current. Thus, the gain of the op-amp 104 while the light source 100 is outputting blue light is determined by the resistor 302.

With the light quantity measurement apparatus 30 in this embodiment, during the period in which red light is being outputted from the light source 100, only the analog switch 301 is ON, and the analog switches 303 and 305 are OFF. During the period in which blue light is being outputted from the light source 100, the analog switches 301 and 305 are both OFF. During the period in which green light is being outputted from the light source 100, only the analog switch 305 is ON, and the analog switch 301 is OFF.

Consequently, a gain at which the output levels for the various colors are substantially same level can be obtained by setting the resistance values for the resistors 300, 302, and 304 according to the sensitivity of the photodiode 102 or the input levels corresponding to the various colors.

These gain values are used in converting the optical current output of the photodiode 102 into voltage by the op-amp 104.
3-3. Effect, Etc.

With the light quantity measurement apparatus 30 in this embodiment, because of the above configuration, the microprocessor 106 controls whether the analog switches 301 and 305 are ON or OFF so that the output of the op-amp 104 will remain substantially same level in the periods when red, blue, and green light is being outputted in a time division by the light source 100.

Consequently, just as with the configuration in Embodiment 2, even if the energy amounts of the input level of the signals inputted to the A/D converter 105 vary with the color of light, or if the sensitivity of the photodiode 102 varies with the wavelength of light, the output level of the op-amp 104 can be kept substantially same level.
(Embodiment 4)

Figure 5:
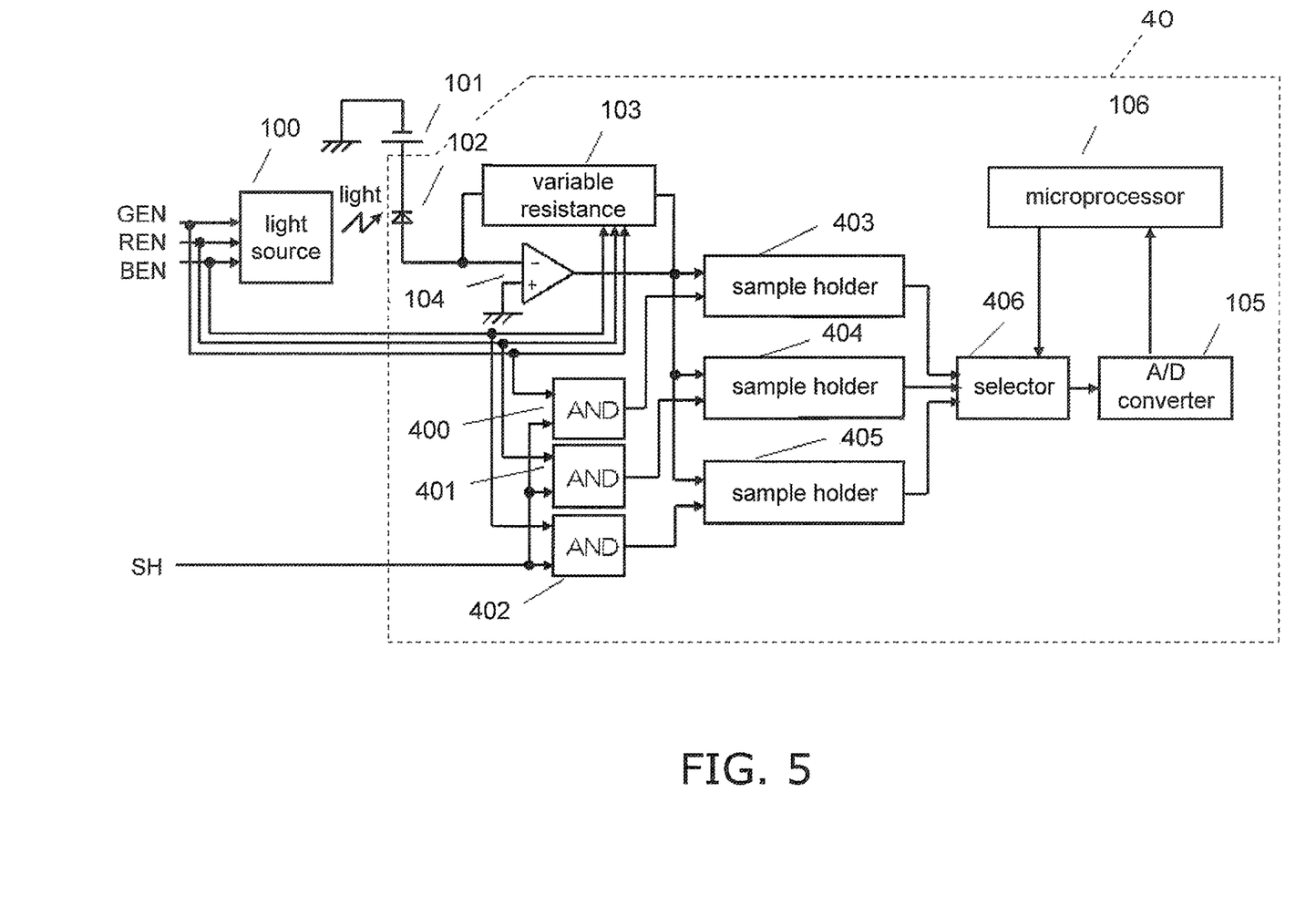
FIG. 5 is a configuration diagram of the light quantity measurement apparatus pertaining to Embodiment 4.

A light quantity measurement apparatus 40 pertaining to Embodiment 4 of this disclosure will now be described through reference to FIG. 5.
4-1. Configuration FIG. 5 is a configuration diagram of the light quantity measurement apparatus 40 pertaining to this embodiment.

Of the components described in this embodiment, those having the same function, shape, etc., as the components described in Embodiments 1 to 3 above will be numbered the same and not described again in detail.

In addition to the components of the light quantity measurement apparatus 10 pertaining to Embodiment 1, the light quantity measurement apparatus 40 of this embodiment comprises AND elements 400, 401, and 402, sample holders 403, 404, and 405, and a selector 406.

The lighting control signal GEN and a sample hold signal SH are inputted to the AND element 400, which outputs the logical product of these.

The lighting control signal REN and the sample hold signal SH are inputted to the AND element 401, which outputs the logical product of these.

The lighting control signal BEN and the sample hold signal SH are inputted to the AND element 402, which outputs the logical product of these.

The sample holder 403 is connected to the output of the op-amp 104, and holds a sample according to the output of the AND element 400.

The sample holder 404 is connected to the output of the op-amp 104, and holds a sample according to the output of the AND element 401.

The sample holder 405 is connected to the output of the op-amp 104, and holds a sample according to the output of the AND element 402.

"Sampling holding" here refers to the holding of an input value.

The selector 406 subjects the output of the sample holder 403, the sample holder 404, and the sample holder 405 to switching under the control of the microprocessor 106, and outputs the result.

The A/D converter 105 subjects the output of the selector 406 to A/D conversion.
4-2. Operation With the light quantity measurement apparatus 40 in this embodiment, because of the above configuration, just as in Embodiment 1 above, the value of the variable resistance 103 is changed according to the red, green, or blue emission period of the light source 100, which allows the output of the op-amp 104 to be kept substantially the same in the red, green, and blue emission periods of the light source 100.

Furthermore, with the light quantity measurement apparatus 40 in this embodiment, the output of the op-amp 104 is held as a sample by three sample holders, and the output of these is switched by the selector 406 and successively inputted to the A/D converter 105 for A/D conversion.

Consequently, the A/D converter 105 can perform its A/D conversion over the required conversion time regardless of the time span of the red, green, and blue light output of the light source 100. Thus, very accurate light quantity measurement can be carried out even though the processing of the A/D converter 105 is slow.

4-3. Effect, Etc.

With the light quantity measurement apparatus 40 in this embodiment, because of the above configuration, the microprocessor 106 controls the value of the variable resistance 103 so that the output of the op-amp 104 will remain substantially same level in the periods when red, blue, and green light is being outputted by the light source 100.

Consequently, even if the energy amounts of the input level of the signals inputted to the A/D converter 105 vary with the color of light, or if the sensitivity of the photodiode 102 varies with the wavelength of light, the output level of the op-amp 104 can be kept substantially same level.

Furthermore, in this embodiment, because the AND elements 400, 401, and 402, the sample holders 403, 404, and 405, and the selector 406 are provided, the input levels in the red, blue, and green periods can be same level for the A/D converter 105. Thus, very accurate measurement can be carried out even if the A/D converter is one that processes at low speed.

(Embodiment 5)

A light quantity measurement apparatus 50 pertaining to Embodiment 5 of this disclosure will now be described through reference to FIG. 6.

5-1. Configuration

Figure 6:
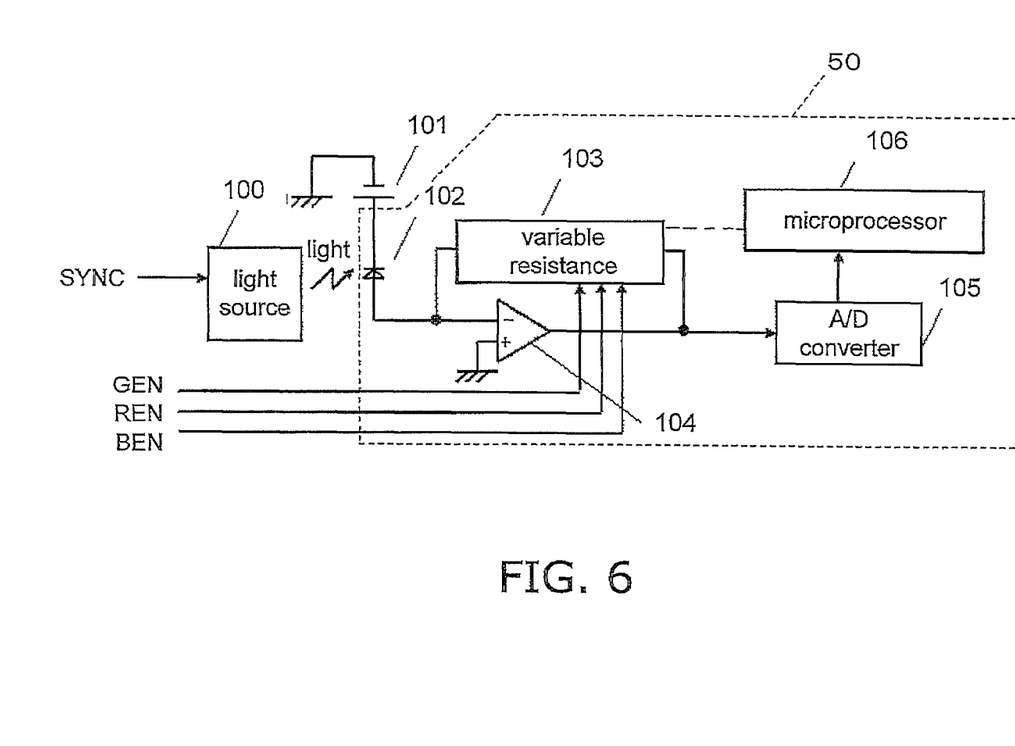
FIG. 6 is a configuration diagram of the light quantity measurement apparatus pertaining to Embodiment 5.

FIG. 6 is a configuration diagram of the light quantity measurement apparatus 50 pertaining to this embodiment.

The light quantity measurement apparatus 50 in this embodiment is configured the same as the light quantity measurement apparatus 10 pertaining to Embodiment 1, but the control of the light source 100 does not rely on the lighting control signals REN, GEN, and BEN, and instead the control is by synchronization signal SYNC.

5-2. Operation

The light source 100 outputs red, green, and blue light in synchronization with the synchronization signal SYNC.

The synchronization signal SYNC is synchronized with the lighting control signals REN, GEN, and BEN, and is in a constant phase relation. The configuration is such that the timing at which the light source 100 outputs red, green, and blue light in synchronization with the synchronization signal SYNC matches the timing at which the lighting control signals REN, GEN, and BEN indicate the red, green, and blue periods.

With this configuration, the timing at which the variable resistance 103 is switched matches the timing at which the light source 100 outputs red, green and blue light.

5-3. Effect, Etc.

With the light quantity measurement apparatus 50 in this embodiment, as discussed above, even when red, green and blue colors are outputted from the light source 100 in synchronization with the timing at which the synchronization signal SYNC is received, the same effect as with the light quantity measurement apparatus 10 pertaining to Embodiment 1 can be obtained with the same configuration.

(Embodiment 6)

A projector (projection-type display device) 700 pertaining to Embodiment 6 in this disclosure will now be described through reference to FIG. 7.

The projector 700 in this embodiment comprises one of the light quantity measurement apparatuses 10, 20, 30, 40, and 50 pertaining to Embodiments 1 to 5 above.

Figure 7:
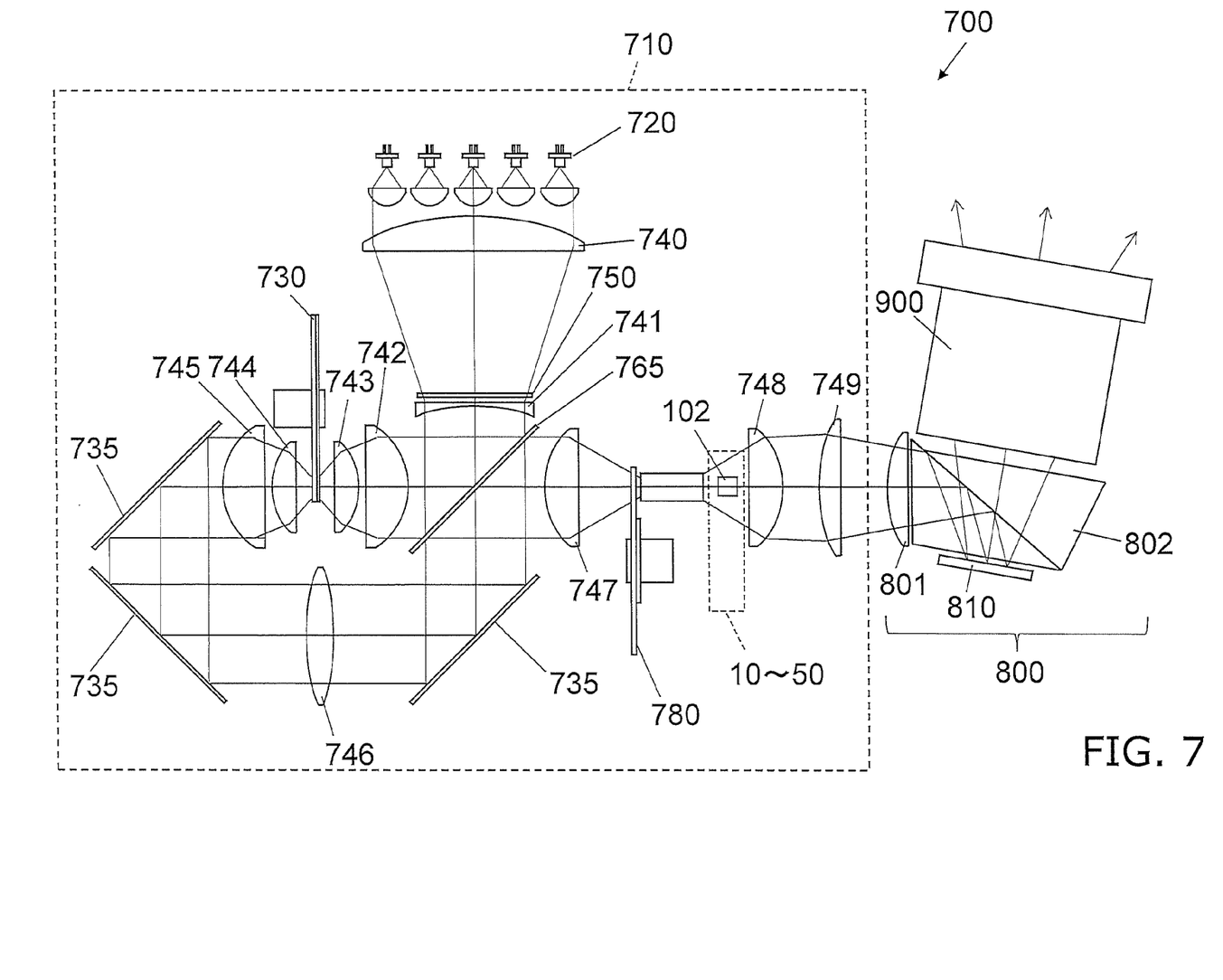

FIG. 7 is a schematic view of the configuration of the projector 700.

The projector 700 comprises a lighting device 710, an image production section 800, and a projection lens 900. The projector 700 uses light produced by the lighting device 710 to produce image with the image production section 800.

The image produced by the image production section 800 is projected onto a screen or the like (not shown) by the projection lens 900.

Configuration of Projector 700

The configuration of the projector 700 will now be described in detail.

The lighting device 710 comprises light source unit 720, a phosphor wheel 730, a plurality of mirrors 735, a plurality of lenses 740 to 749, a diffuser plate 750, a dichroic mirror 765, a filter wheel 780, and at least one of the light quantity measurement apparatuses 10, 20, 30, 40 and 50 as shown in FIG. 7.

The light source unit 720 is a light source that emits blue laser light.

The lens 740 converges and superposes light emitted from the light source unit 720.

The diffuser plate 750 transmits light converged by the lens 740. The diffuser plate 750 reduces the coherence of light emitted from the light source unit 720.

The lens 741 collects light transmitted by the diffuser plate 750 into a substantially parallel light beam.

The dichroic mirror 765 is a color combination element that reflects light of a specific wavelength (such as blue light) and transmits light of other wavelengths (such as green light and red light), and reflects the parallelized light transmitted by the lens 741.

The lenses 742 and 743 converge the light shined on the phosphor wheel 730 so that the focus spot is small. This increases the utilization efficiency of light transmitted by the phosphor wheel 730.

Figure 8A:
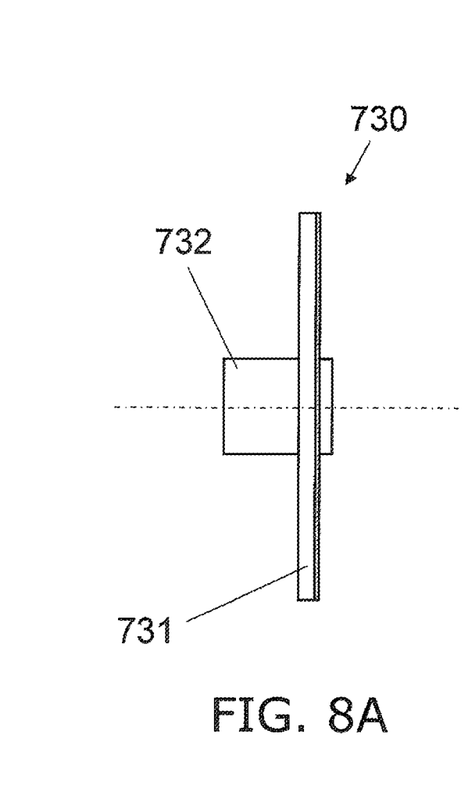
FIGS. 8A and 8B are a side view and a plan view of configuration of the phosphor wheel included in the projection-type display device shown in FIG. 7.
Figure 8B:
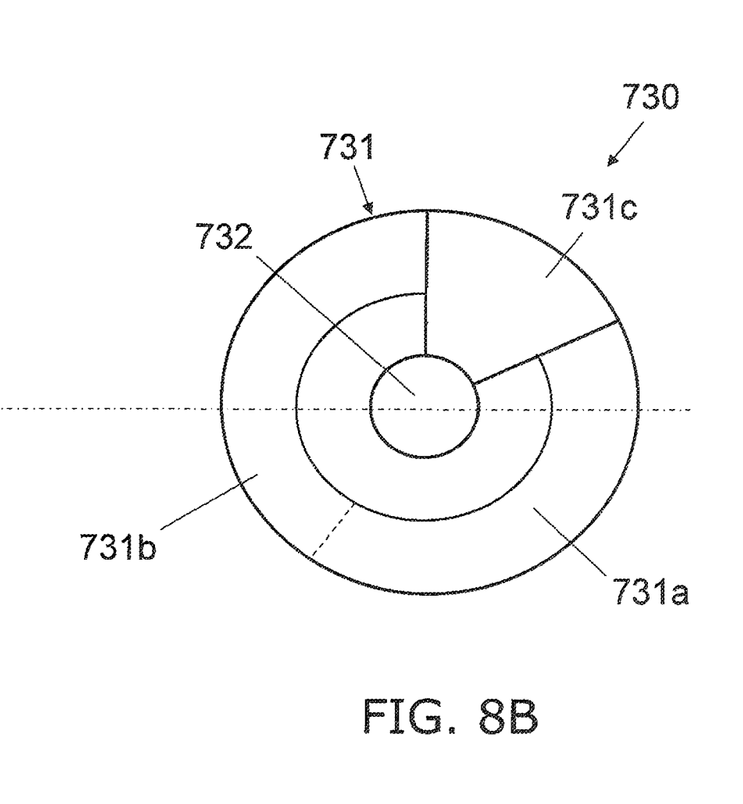

The phosphor wheel 730 has a metal plate 731 equipped with annular regions 731a, 731b in which part of the region in the peripheral direction is coated with a phosphor and a cutout region 731c, and a motor 732 as a drive means as shown in FIGS. 8A and 8B.

The annular metal plate 731 is rotationally driven by the motor 732. The metal plate reflects fluorescent light (such as green light and red light) that is excited in the regions 731a, 731b of the phosphor wheel 730 coated with the phosphor. This fluorescent light is again parallelized by the lenses 743 and 742 and returns to the dichroic mirror 765.

Meanwhile, the light (such as blue light) transmitted by the cutout region 731c of the phosphor wheel 730 is again parallelized by the lenses 744 and 745, goes through the plurality of mirrors 735 and the lens 746, and returns to the dichroic mirror 765.

The dichroic mirror 765 combines light (such as blue light) transmitted by the cutout region 731c of the phosphor wheel 730 with light (such as green light and red light) reflected by the region 731a, 731b coated with the phosphor in the phosphor wheel 730.

The lens 747 converges the light combined by the dichroic mirror 765, and guides it to the filter wheel 780.

The filter wheel 780 has a glass substrate (not shown) divided up in the peripheral direction, and a color filter substrate (not shown).

The glass substrate is highly transmissive of the incident light over the entire visible band, whereas the color filter substrate is highly reflective of light at or below a certain wavelength, and highly transmissive of light in the visible band and at or above a certain wavelength.

The phosphor wheel 730 and the filter wheel 780 are synchronized and rotationally controlled by a formatter (not shown) so as to rotate at the same speed.

This adjusts the timing so that fluorescent light (such as green light and red light) excited at the region 731a, 731b of the phosphor wheel 730 will be incident on a specific region in the color filter substrate of the filter wheel 780, and extra wavelength components outside the particular wavelength range are removed.

Consequently, by the lights (such as green light and red light) which transmitted by the specific region of the filter wheel 780 after being reflected by the regions 731*a*, 731*b* of the phosphor wheel 730, and the light (such as blue light) which transmitted by the part of glass substrate of the filter wheel 780 and the cutout region 731*c* of the phosphor wheel 730, high-purity light is produced in the three primary colors of red, blue, and green.

The image production section 800 comprises a lens 801, a total reflection prism 802 and a one DMD (digital micromirror device) 810.

The DMD 810 has 1920×1080 micromirrors. The DMD 810 deflects the micromirrors according to an image signal, so that the light is split into light that is incident to the projection lens 900 and light that is reflected outside of the effective range of the projection lens 900.

The projection lens 900 projects temporally combined image light produced by the DMD 810 onto a screen (not shown).

Configuration of Light Quantity Measurement Apparatuses 10 to 50

The light quantity measurement apparatuses installed in the projector 700 in this embodiment will now be described.

Of the components described in this embodiment, those having the same function, shape, etc., as the components described in Embodiments 1 to 5 above will be numbered the same and not described again in detail.

The photodiode 102 (optical semiconductor) of the light quantity measurement apparatus is provided so as to measure the laser light of a plurality of colors outputted from the light source unit 720 and transmitted via the dichroic mirror 765, the phosphor wheel 730, etc., and through the filter wheel 780.

More specifically, the light quantity measurement apparatuses 10 to 50 in this embodiment receive the time-divided light of three primary colors (red, green and blue) at the photodiode 102 by synchronizing the rotation of the phosphor wheel 730 and the filter wheel 780 in the lighting device 710.

Optical current flows when the photodiode 102 receives this red, green and blue light.

As described in Embodiments 1 to 5 above, with the light quantity measurement apparatuses 10 to 50, the gain that converts optical current into voltage is switched according to the synchronization signal SYNC or the lighting control signals REN, GEN, and BEN by a formatter (not shown).

Specifically, in this embodiment, the microprocessor 106 switches the resistance of the variable resistance 103 (Embodiments 1, 4, and 5), the analog switches 201, 203, and 205 (Embodiment 2), the analog switches 301 and 305 (Embodiment 3), etc., according to the output period of light of the various colors outputted according to the lighting control signals REN, GEN, and BEN, etc.

Consequently, even when the photodiode 102 receives light of different colors, A/D conversion can be performed at the same output level for all the colors. As a result, the output level of the op-amp 104 can be kept substantially same level, which prevents a decrease in measurement accuracy attributable to sensitivity difference of the photodiode 102 or a difference in the input energy amounts for the various colors of light, thereby improving measurement accuracy.

Other Embodiments

Embodiments 1 to 6 were described above as examples of the technology disclosed herein, but the technology in this disclosure is not limited to or by these examples, and can also be applied to embodiments in which modifications, substitutions, additions, omissions, and so forth have been made as needed. Also, the various constituent elements described in Embodiments 1 to 6 above can be combined to create new embodiments. In view of this, examples of other embodiments are given below.

(A)

In Embodiments 1 to 5, a configuration was described in which an LED was used as an example of the light source 100, but the present disclosure is not limited to this.

For example, the light source 100 may be some light source other than an LED, so long as red, green, and blue light can be outputted according to a synchronization signal SYNC or lighting control signals REN, GEN, and BEN.

(B)

This disclosure is not limited to a configuration in which the light source 100 is red, green, and blue LEDs.

For example, as described in Embodiment 6, a laser, or a phosphor that is excited with a laser, may be used instead of an LED.

(C)

Nor is the light source 100 limited to the use of red, green, and blue LEDs. A laser or a phosphor that is excited with a laser may be used instead of an LED.

(D)

In this disclosure, the light source may be a combination of a color wheel having red, green and blue filters, and an ultrahigh pressure mercury vapor lamp.

Furthermore, the light source may be a combination of a blue laser and a phosphor wheel having phosphors that excite red, green, and blue light, or a combination of a blue laser and a phosphor wheel having phosphors that excite red and green light.

Embodiments were described above as examples of the technology disclosed herein, and the appended drawings and detailed description were provided to that end. Therefore, the constituent elements shown in the appended drawings and discussed in the detailed description may include not only constituent elements that are essential to solving the problem, but also constituent elements that are not essential to solving the problem.

Accordingly, just because these non-essential constituent elements are illustrated in the appended drawings and discussed in the detailed description, it should not be concluded that these non-essential constituent elements are essential.

Also, the above embodiments are intended to illustrate examples of the technology disclosed herein, so various modifications, substitutions, additions, omissions, and so forth can be made within the scope of the patent claims or equivalents thereof.

GENERAL INTERPRETATION OF TERMS

In understanding the scope of the present disclosure, the term "configured" as used herein to describe a component, section, or part of a device includes hardware and/or software that is constructed and/or programmed to carry out the desired function.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having,"

and their derivatives. Also, the terms "part," "section," "portion," "member," or "element" when used in the singular can have the dual meaning of a single part or a plurality of parts.

Terms that are expressed as "means-plus function" in the claims should include any structure that can be utilized to carry out the function of that part of the present disclosure. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present disclosure, it will be apparent to those skilled in the art from this disclosure that various changes and modifications can be made herein without departing from the scope of the disclosure as defined in the appended claims. Furthermore, the foregoing descriptions of the embodiments according to the present disclosure are provided for illustration only, and not for the purpose of limiting the disclosure as defined by the appended claims and their equivalents. Thus, the scope of the disclosure is not limited to the disclosed embodiments.

INDUSTRIAL APPLICABILITY

The present disclosure can be broadly applied to light quantity measurement apparatuses that measure the quantity of light of various colors of a time-division color display projector light source.

The invention claimed is:

1. A light sensitivity controlling apparatus, comprising:
   an optical semiconductor configured to receive a plurality of colors of light emitted from a light source in a time division;
   an amplifier element configured to convert optical current flowing to the optical semiconductor into voltage by receiving the plurality of colors of light;
   a resistor unit configured to switch the gain for converting the optical current inputted to the amplifier element into voltage, corresponding to each of the plurality of colors of light;
   an A/D converter configured to convert the voltage outputted by the amplifier element from an analog signal into a digital signal; and
   a controller configured to control the resistor unit so that the output level corresponding to the various colors of light outputted from the A/D converter remains substantially at the same level.

2. A light sensitivity controlling apparatus according to claim 1, wherein the resistor unit has a variable resistance.

3. A light sensitivity controlling apparatus according to claim 1, wherein the resistor unit is configured such that one or more circuits comprising a resistor and a switch connected in series are disposed in parallel.

4. A light sensitivity controlling apparatus according to claim 1, further comprising:
   a sample holder configured to hold an output voltage value outputted from the amplifier element; and
   a selector configured to switch the output of the sample holder on the basis of a control signal from the controller, and outputs this to the A/D converter.

5. A projection-type display device, comprising:
   the light sensitivity controlling apparatus according to claim 1;
   a light source configured to emit a plurality of colors of light; and
   a voltage application unit configured to apply a reference voltage to the optical semiconductor.

* * * * *